US009777649B2

(12) United States Patent
Nishida et al.

(10) Patent No.: US 9,777,649 B2
(45) Date of Patent: Oct. 3, 2017

(54) ALCOHOL CONCENTRATION ESTIMATION AND DETECTION APPARATUS FOR AN ENGINE

(75) Inventors: Kenji Nishida, Saitama (JP); Kazuto Fukuzawa, Saitama (JP); Tetsuya Kaneko, Saitama (JP); Kenjiro Saito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1673 days.

(21) Appl. No.: 13/011,287

(22) Filed: Jan. 21, 2011

(65) Prior Publication Data

US 2011/0191006 A1    Aug. 4, 2011

(30) Foreign Application Priority Data

Feb. 1, 2010  (JP) ................................. 2010-020201

(51) Int. Cl.
*F02D 41/14*    (2006.01)
*F02D 41/00*    (2006.01)
(Continued)

(52) U.S. Cl.
CPC ....... *F02D 41/0025* (2013.01); *F02D 19/084* (2013.01); *F02D 19/088* (2013.01);
(Continued)

(58) Field of Classification Search
USPC ............ 123/436, 406.31, 435; 701/111, 114, 701/115; 73/114.02–114.04, 114.16,
(Continued)

(56) References Cited

U.S. PATENT DOCUMENTS 4,107,776 A * 8/1978 Beale .............................. 701/99
4,463,729 A * 8/1984 Bullis et al. .................. 123/478
(Continued)

FOREIGN PATENT DOCUMENTS

JP         63-005131 A     1/1988
JP         2002-115598 A   4/2002
(Continued)

*Primary Examiner* — Hai Huynh
*Assistant Examiner* — Gonzalo Laguarda
(74) *Attorney, Agent, or Firm* — Carrier Blackman & Associates, P.C.; Joseph P. Carrier; Jeffrey T. Gedeon (57) ABSTRACT

In an alcohol concentration estimation apparatus for an engine, a first crank angular speed ($\omega 1$) within a first predetermined interval overlapping with the compression top dead center is calculated, and a first variation amount ($\Delta \omega 1$) is calculated by subtracting $\omega 1$ from an average engine speed. A second crank angular speed ($\omega 2$) within a second predetermined interval overlapping with the combustion bottom dead center is calculated, and a second variation amount ($\Delta \omega 2$) is calculated by subtracting $\omega 1$ from $\omega 2$. In a relationship between air fuel ratio A/F and an indicated mean effective pressure (IMEP)/charging efficiency ($\eta c$) of the engine when the engine is operated with a predetermined fuel injection map indicating a relationship between A/F and IMEP/$\eta c$ for each desired alcohol concentration, IMEP/$\eta c$ is substituted by $\Delta \omega 2/\Delta \omega 1$ ratio to estimate an alcohol concentration in fuel. The alcohol concentration estimation apparatus eliminates requirement of sensors for detecting an intake air mass.

20 Claims, 7 Drawing Sheets

(51) Int. Cl.
  *F02D 41/24* (2006.01)
  *F02P 5/15* (2006.01)
  *F02D 19/08* (2006.01)

(52) U.S. Cl.
  CPC ..... *F02D 41/0097* (2013.01); *F02D 41/2422* (2013.01); *F02P 5/1502* (2013.01); *F02D 41/1497* (2013.01); *F02D 2200/0612* (2013.01); *Y02T 10/36* (2013.01); *Y02T 10/46* (2013.01)

(58) Field of Classification Search
  USPC ................ 73/114.17, 114.22, 114.25, 114.26
  See application file for complete search history.

(56) References Cited

U.S. PATENT DOCUMENTS

| | | | |
|---|---|---|---|
| 4,691,286 A * | 9/1987 | Obayashi et al. | 701/102 |
| 6,178,943 B1 * | 1/2001 | Taga et al. | 123/295 |
| 6,234,139 B1 * | 5/2001 | Taga et al. | 123/295 |
| 6,328,014 B1 * | 12/2001 | Bradshaw | 123/300 |
| 6,626,145 B2 | 9/2003 | Enoyoshi et al. | |
| 6,755,176 B2 * | 6/2004 | Takeuchi et al. | 123/299 |
| 2012/0234085 A1 * | 9/2012 | Nishida et al. | 73/114.72 |

FOREIGN PATENT DOCUMENTS

| | | |
|---|---|---|
| JP | 2005-105822 A | 4/2005 |
| JP | 2009-013792 A | 1/2009 |
| JP | 2010-001846 A | 1/2010 |

\* cited by examiner

IMEP: INDIATED MEAN EFFECTIVE PRESSURE
$\eta c$ : CHARGING EFFICIENCY
A/F : AIR FUEL RATIO
MBT : MINIMUM ADVANCE FOR BEST TORQUE

ALCOHOL CONCENTRATION ESTIMATION AND DETECTION APPARATUS FOR AN ENGINE

CROSS-REFERENCE TO RELATED APPLICATIONS

The present invention claims priority under 35 USC 119 based on Japanese patent application No. 2010-020201, filed on Feb. 1, 2010. The entire subject matter of this priority document, including specification claims and drawings thereof, is incorporated by reference herein.

BACKGROUND OF THE INVENTION

1. Field of the Invention

The present invention relates to an alcohol concentration estimation and detection apparatus for an engine. More particularly, the present invention relates to an alcohol concentration estimation and detection apparatus which is operable to estimate and detect an alcohol concentration of a mixed-content fuel, based on an output signal of a crank pulse rotor configured to rotate in synchronism with a crankshaft of the engine.

2. Description of the Background Art

In recent years, biofuels, aimed at providing more earth-friendly fuels, have become popular as fuels for operating internal-combustion engines for automobiles and motorcycles. Gasoline fuel mixtures containing ethyl alcohol, which may be extracted from sweet potatoes, corn and/or other plant material, may be used as one type of power source containing a biofuel.

A vehicle ready for such an alcohol-containing fuel mixture as described above is generally called a Flex-Fuel Vehicle (FFV), and in order to normally carry out suitable engine control such as control of the ignition timing for any alcohol-containing fuel, various sensors are required, such as an oxygen sensor for detecting a stoichiometric air-fuel ratio state, and an air flow sensor for predicting the air fuel ratio (A/F), as described in Japanese Patent Laid-Open No. Sho 63-5131.

In particular, FFV engine control described in Japanese Patent Laid-Open No. Sho 63-5131 is carried out in the following procedure.

First, a "stoichiometric air fuel ratio state" regarding an alcohol-containing fuel irrespective of the inclusion concentration of alcohols is detected by an oxygen sensor attached in an exhaust pipe of an engine, and the fuel injection amount is adjusted in response to a detected stoichiometric air fuel ratio state to control the air fuel mixture so as to achieve a desired stoichiometric air fuel ratio.

The air fuel ratio (A/F) in the stoichiometric air fuel ratio state is determined from an intake air mass (Ga) during operation predicted from a signal from a sensor for detecting the intake air mass such as an air flow sensor or an intake air negative pressure sensor and a fuel consumption amount (Gf) during operation predicted by integration of the fuel injection time within a fixed period of time.

Since the relationship between the alcohol concentration and the stoichiometric air fuel ratio is known in advance, the alcohol concentration can be predicted from the air fuel ratio (A/F).

A fuel of a mixture of the same combination of an intake air mass (Ga) and a fuel consumption amount (GO has a tendency that, as the alcohol concentration increases, the low calorific power decreases and the output power decreases. Accordingly, the appropriate ignition timing is retarded by a greater amount as the alcohol concentration increases. Taking such phenomena into consideration, as described above, a control map for the ignition timing is prepared for each alcohol concentration to allow appropriate FFV engine control.

Further, a technique is conventionally known which includes a crank pulse rotor which rotates in synchronism with a crankshaft of an engine and a pickup coil for detecting a passing state of reluctors (teeth) provided on the pulse rotor and can detect various states of the engine based on a pulse signal outputted from the pickup coil.

Japanese PatentLaid-Open No. 2002-115598 discloses a technique wherein a reluctor of a crank pulse rotor is provided at a position in the proximity of the top dead center of an engine and a ratio between a period of time in which the pulser rotor makes one rotation and a period of time in which the reluctor passes is calculated such that the load state of the engine is detected based on a degree of variation of the ratio.

However, in carrying out FFV engine control, a less expensive system which omits sensors to the utmost is demanded for a less expensive vehicle such as a motorcycle.

While the technique disclosed in Japanese Patent Laid-Open No. 2002-115598 detects the load state of an engine based on a state of rotation of a crankshaft to carry out ignition operation at a suitable timing, an application of the same to a configuration which can detect various values for carrying out engine control is expected.

It is one of the objects of the present invention to provide an alcohol concentration estimation and detection apparatus which solves the problems of the prior art as described above, and which eliminates the necessity for various sensors which have conventionally been required for detection of alcohol concentration, by estimating and detecting the alcohol concentration of an alcohol-containing fuel based on an output signal of a crank pulse rotor.

SUMMARY OF THE INVENTION

In order to achieve the above objects, the present invention according to a first aspect thereof provides an alcohol concentration estimation and detection apparatus (30) to which a crank pulse is supplied from a pickup (PC) which detects passing of a plurality of reluctors/teeth (52) provided on a crank pulse rotor (50) which rotates in synchronism with a crankshaft (55) of an engine.

The alcohol concentration estimation and detection apparatus according to the first aspect of the present invention includes an NeA calculation section (38) adapted to calculate an average engine speed (NeA) of the engine based on the crank pulse output; and a $\Delta\omega 1$, $\Delta\omega 2$ calculation section (32) adapted to calculate a first crank angular speed ($\omega 1$) within a first predetermined interval ($\tau 1$) overlapping with a compression top dead center (TDC) of the engine and subtract the first crank angular speed ($\omega 1$) from the average engine speed (NeA) to calculate a first variation amount ($\Delta\omega 1$) and to calculate a second crank angular speed ($\omega 2$) within a second predetermined interval ($\tau 2$) overlapping with a combustion bottom dead center (BDC) of the engine and subtract the first crank angular speed ($\omega 1$) from the second crank angular speed to calculate a second variation amount ($\Delta\omega 2$).

The alcohol concentration estimation and detection apparatus (30) is operable to estimate and detect an alcohol concentration of a fuel based on the values of the first variation amount ($\Delta\omega 1$) and the second variation amount ($\Delta\omega 2$).

The alcohol concentration estimation and detection apparatus according a second aspect thereof, in addition to the first aspect, includes a fuel injection map set so as to operate the engine with a stoichiometric air fuel ratio where the engine is operated with a fuel having a predetermined alcohol concentration; a $\Delta\omega 2/\Delta\omega 1$ calculation section (33) adapted to calculate, when the engine is operated with the setting of the fuel injection map, a ratio between the first variation amount ($\Delta\omega 1$) and the second variation amount ($\Delta\omega 2$); and an alcohol concentration estimation map group (43) provided for individual predetermined engine speeds and indicative of a plurality of relationships between a plurality of alcohol concentrations and a parameter which increases in proportion to the alcohol concentration;

The alcohol concentration estimation and detection apparatus (30) according to the second aspect is operable to select one of alcohol concentration estimation maps (43a) which coincides with the average engine speed (NeA) and determine the parameter from the ratio between the first variation amount ($\Delta\omega 1$) and the second variation amount ($\Delta\omega 2$) to estimate and detect the alcohol concentration.

The alcohol concentration estimation and detection apparatus according a third aspect thereof, in addition to the second aspect, is characteristic in that each of the alcohol concentration estimation maps (43a) is a map which indicates a relationship between the alcohol concentration and an indicated mean effective pressure (IMEP)/charging efficiency ($\eta c$) under a condition that the engine is operated with a fuel injection map set so that the engine is operated in a stoichiometric air fuel ratio where the engine is operated with a fuel having a predetermined alcohol concentration; and the alcohol concentration estimation and detection apparatus (30) is operable to associate the first variation amount ($\Delta\omega 1$) with the charging efficiency ($\eta c$) and associates the second variation amount ($\Delta\omega 2$) with the indicated mean effective pressure (IMEP) to use the associated parameters as the parameters.

Further, the alcohol concentration estimation and detection apparatus according to a fourth aspect, in addition to one the first through third aspects, is characteristic in that the first predetermined interval ($\tau 1$) is an interval from a falling point (C1) of a crank pulse (P1) positioned just before the compression top dead center (TDC) to another falling point (C2) of another crank pulse (P2) positioned just after the compression top dead center (TDC); and the second predetermined interval ($\tau 2$) is an interval from a falling point (C3) of a crank pulse (P3) positioned just before the combustion bottom dead center (BDC) to another falling point (C4) of another crank pulse (P4) positioned just after the combustion bottom dead center (BDC).

Further, the alcohol concentration estimation and detection apparatus according to a fifth aspect, in addition to one the first through fourth aspects, is characteristic in that at least one of the reluctors (52) of the crank pulse rotor (50) is formed so as to stretch over the compression top dead center (TDC) or the combustion bottom dead center (BDC).

Furthermore, the present invention according to a sixth aspect thereof provides an alcohol concentration estimation and detection apparatus (30) to which a crank pulse is supplied from a pickup (PC) which detects passing of a plurality of reluctors (52) provided on a crank pulse rotor (50) which rotates in synchronism with a crankshaft (55) of an engine.

The alcohol concentration estimation and detection apparatus (30) according to the sixth aspect of the present invention includes a $\Delta\omega 1$, $\Delta\omega 2$ calculation section (32) adapted to calculate a first variation amount ($\Delta\omega 1$) from a difference between an angular speed upon starting of a compression stroke of the engine and an angular speed in the proximity of the compression top dead center and calculate a second crank angular speed ($\omega 2$) within a second predetermined interval ($\tau 2$) overlapping with the combustion bottom dead center (BDC) of the engine and to subtract a first crank angular speed ($\omega 1$) from the second crank angular speed ($\omega 2$) to calculate a second variation amount ($\Delta\omega 2$). The alcohol concentration estimation and detection apparatus (30) is operable to estimate and detect an alcohol concentration of a fuel based on the values of the first variation amount ($\Delta\omega 1$) and the second variation amount ($\Delta\omega 2$).

EFFECTS OF THE INVENTION

According to the first aspect of the present invention, the alcohol concentration estimation and detection apparatus includes the NeA calculation section adapted to calculate the average engine speed of the engine based on the crank pulse output, and the $\Delta\omega 1$, $\Delta\omega 2$ calculation section adapted to calculate the first crank angular speed within the first predetermined interval overlapping with the compression top dead center of the engine and subtract the first crank angular speed from the average engine speed to calculate the first variation amount and to calculate the second crank angular speed within the second predetermined interval overlapping with the combustion bottom dead center of the engine and subtract the first crank angular speed from the second crank angular speed to calculate the second variation amount.

The alcohol concentration estimation and detection apparatus is operable to estimate and detect the alcohol concentration of a fuel based on the values of the first variation amount and the second variation amount, which means the alcohol concentration estimation and detection apparatus can estimate and detect the alcohol concentration of the fuel based on the crank pulse output.

Consequently, the alcohol concentration estimation and detection apparatus can detect the alcohol concentration without using a sensor for detecting the air fuel ratio such as an oxygen sensor or a sensor for detecting the intake air mass such as an air flow sensor or an intake negative pressure sensor, and can appropriately control an ignition system, a fuel injection system and so forth based on an estimated value of the alcohol concentration.

According to the second aspect of the present invention, the alcohol concentration estimation and detection apparatus further includes the fuel injection map set so as to operate the engine with a stoichiometric air fuel ratio where the engine is operated with a fuel having a predetermined alcohol concentration, the $\Delta\omega 2/\Delta\omega 1$ calculation section (33) adapted to calculate, when the engine is operated with the setting of the fuel injection map, a ratio between the first variation amount ($\Delta\omega 1$) and the second variation amount ($\Delta\omega 2$), and the alcohol concentration estimation map group (43) provided for the individual predetermined engine speeds and indicative of a plurality of relationships between a plurality of alcohol concentrations and a parameter which increases in proportion to the alcohol concentration.

The alcohol concentration estimation and detection apparatus according to the second aspect thereof is operable to select one of alcohol concentration estimation maps (43a) which coincides with the average engine speed (NeA) and determine the parameter from the ratio between the first variation amount ($\Delta\omega 1$) and the second variation amount ($\Delta\omega 2$) to estimate and detect the alcohol concentration.

Therefore, the alcohol concentration in the fuel can be derived accurately by using the first variation amount and the second variation amount calculated from the crank pulse output and the alcohol concentration estimation map derived by an experiment or the like in advance.

According to the third aspect of the present invention, each of the alcohol concentration estimation maps (43a) is a map which indicates a relationship between the alcohol concentration and an indicated mean effective pressure (IMEP)/charging efficiency ($\eta c$) under the condition that the engine is operated with a fuel injection map set so that the engine is operated in a stoichiometric air fuel ratio where the engine is operated with a fuel having a predetermined alcohol concentration, and the alcohol concentration estimation and detection apparatus (30) associates the first variation amount ($\Delta\omega 1$) with the charging efficiency ($\eta c$) and associates the second variation amount ($\Delta\omega 2$) with the indicated mean effective pressure (IMEP) to use the associated parameters as the parameters. Using this, the alcohol concentration in the fuel can be estimated and detected.

According to the fourth aspect of the present invention, the first predetermined interval is an interval from a falling point of a crank pulse positioned just before the compression top dead center to another falling point of another crank pulse positioned just after the compression top dead center, and the second predetermined interval is an interval from a falling point of a crank pulse positioned just before the combustion bottom dead center to another falling point of another crank pulse positioned just after the combustion bottom dead center. Consequently, the crank angular speed at a position overlapping with the compression top dead center and a position overlapping with the combustion bottom dead center can be detected accurately.

According to the fifth aspect of the present invention, at least one of the reluctors of the crank pulse rotor is formed so as to stretch over the compression top dead center or the combustion bottom dead center. As a result, it is possible to detect the first crank angular speed within the first predetermined interval and the second crank angular speed within the second predetermined interval using the single reluctor. Therefore, it is possible to reduce the number of reluctors to achieve reduction in weight and size of the crank pulse rotor.

According to the sixth aspect of the present invention, the alcohol concentration estimation and detection apparatus includes the $\Delta\omega 1$, $\Delta\omega 2$ calculation section adapted to calculate the first variation amount from the difference between the angular speed upon starting of a compression stroke of the engine and the angular speed in the proximity of the compression top dead center and calculate the second crank angular speed within the second predetermined interval overlapping with the combustion bottom dead center of the engine and to subtract the first crank angular speed from the second crank angular speed to calculate the second variation amount, and the alcohol concentration estimation and detection apparatus estimates and detects the alcohol concentration in the fuel based on the values of the first variation amount and the second variation amount.

In other words, the alcohol concentration estimation and detection apparatus according to the sixth aspect thereof is operable to estimate and detect the alcohol concentration in the fuel based on the crank pulse output.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In the following, an illustrative embodiment of the present invention is described in detail with reference to the drawings.

In the case of a single cylinder engine or a multi-cylinder simultaneous explosion engine, an intake air amount or torque can be predicted from a crank angular speed variation amount or a variation value arising from the variation.

Perceiving that an intake air amount (Charging Efficiency: $\eta c$) and combustion torque (indicated mean effective pressure: IMEP) can be predicted from a variation amount of a crank angular speed $\omega$ of a crankshaft and that an air fuel ratio (A/F) can be predicted from the ratio (IMEP/$\eta c$) between the two, the present invention provides an alcohol concentration estimation and detection apparatus wherein the principle described is applied to predict the alcohol concentration of an alcohol-containing fuel to make it possible to achieve FFV engine control without incorporating a sensor for detecting an air fuel ratio such as an oxygen sensor or a sensor for detecting an intake air mass such as an air flow sensor or an intake negative pressure sensor.

Figure 1:
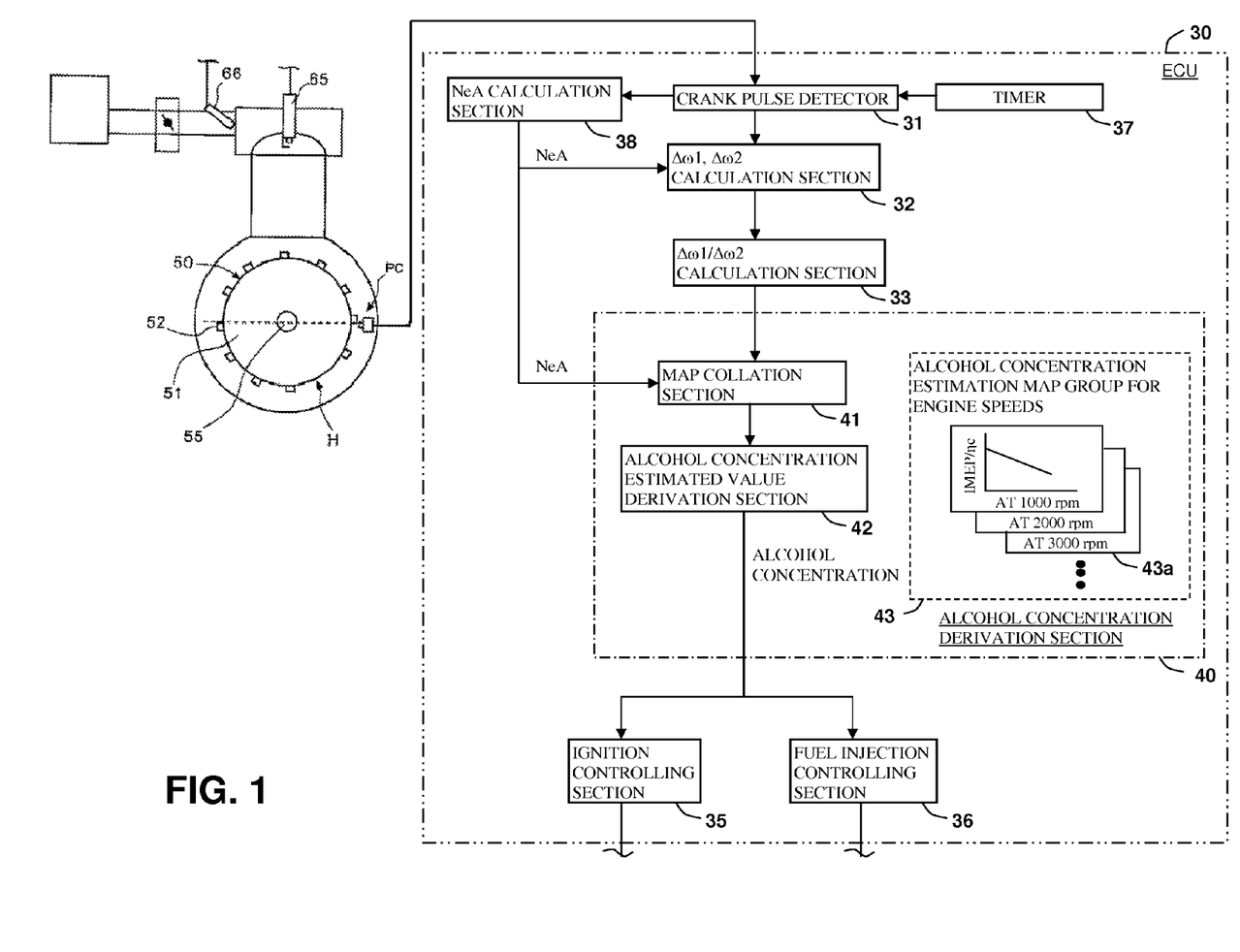
FIG. 1 is a block diagram showing a configuration of an ECU 30 including an alcohol concentration estimation and detection apparatus according to an illustrative embodiment of the present invention.
Figure 2:
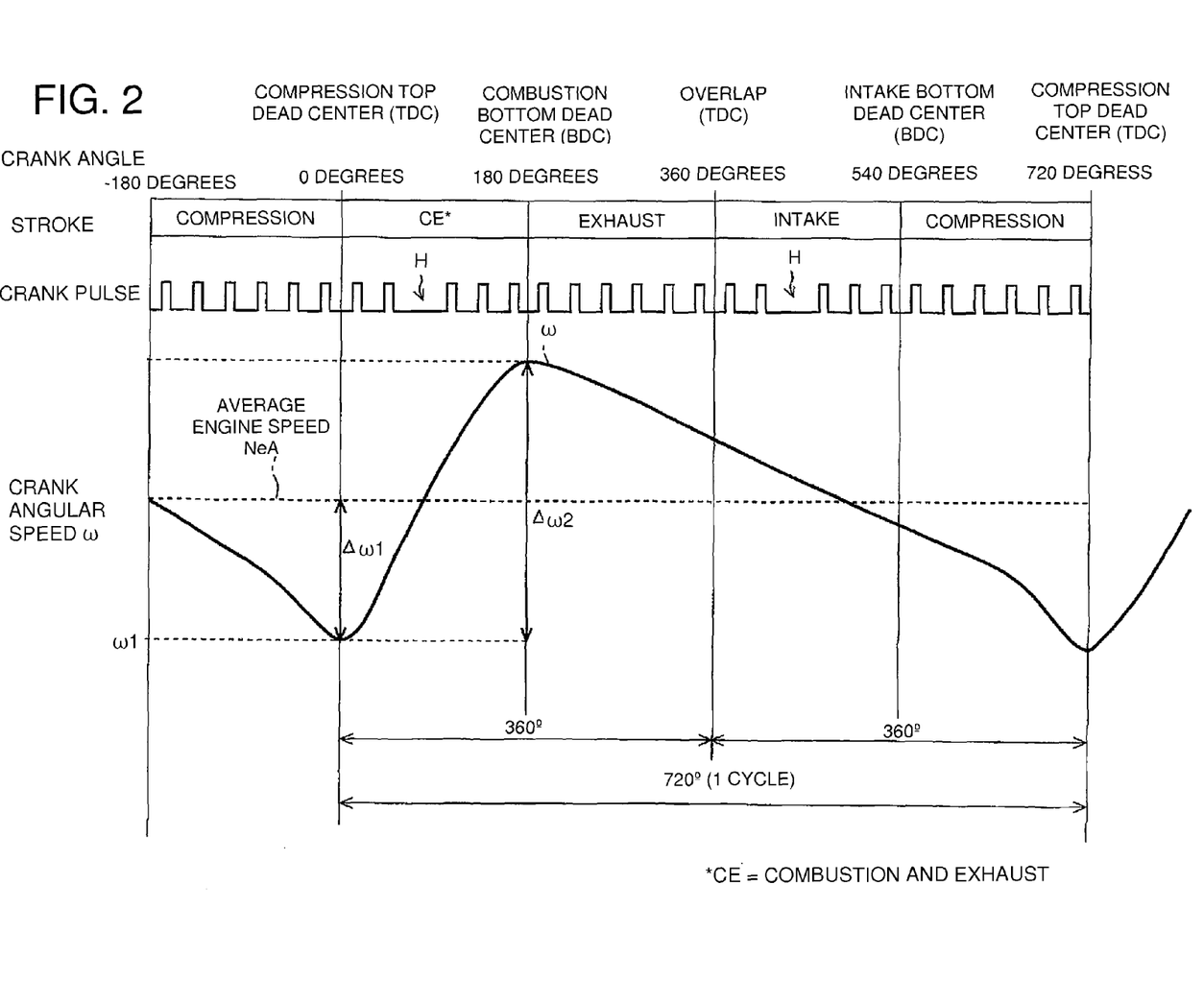
FIG. 2 is a time chart illustrating a relationship between a crank pulse signal and a variation of a crank angular speed $\omega$ within one cycle.
Figure 3:
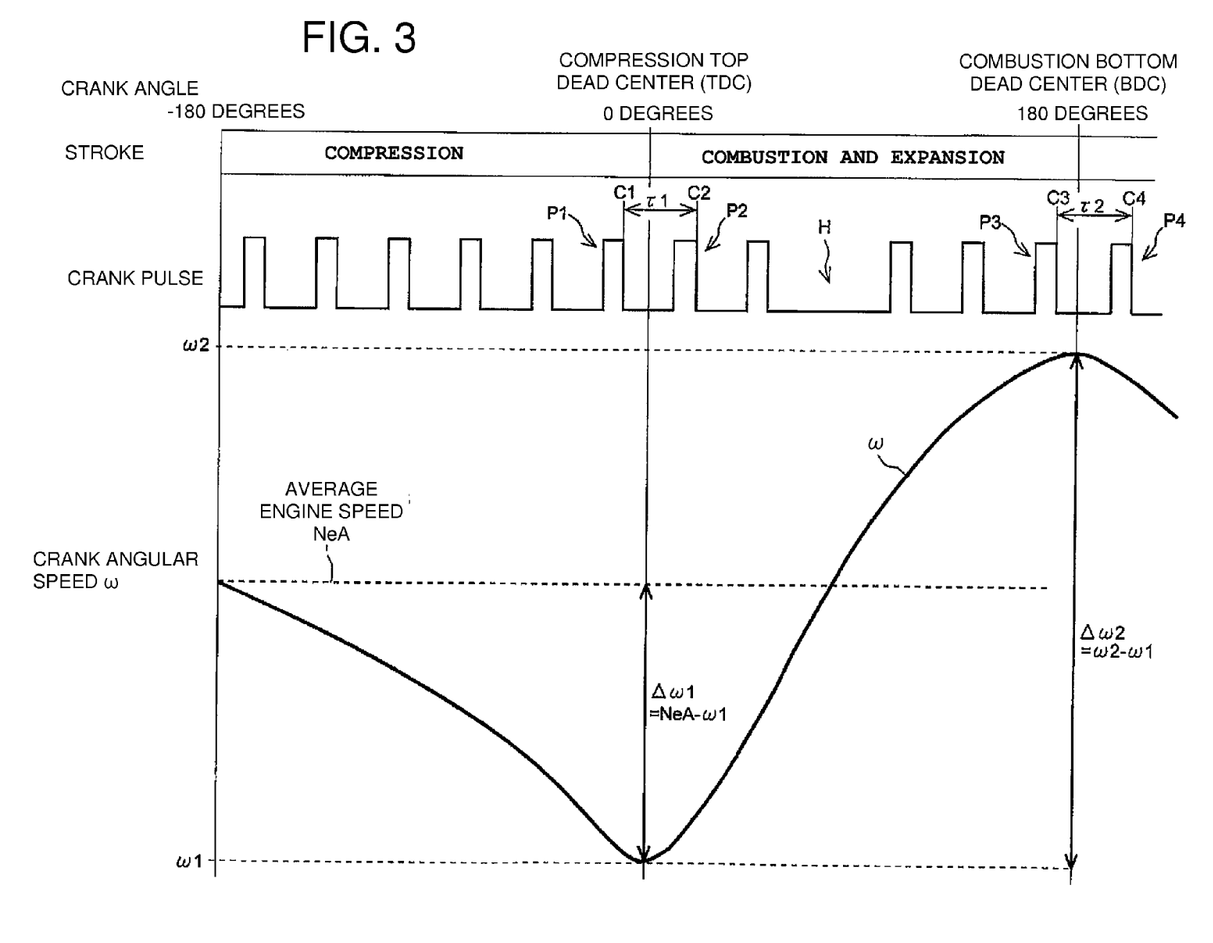
FIG. 3 is an enlarged view of portion of FIG. 2.

FIG. 1 is a block diagram showing a configuration of an ECU 30 including an alcohol concentration estimation and detection apparatus according to an embodiment of the present invention and peripheral equipments of the ECU 30. Further, FIG. 2 is a time chart illustrating a relationship between a crank pulse signal and a variation of a crank angular speed ω within one cycle, and FIG. 3 is an enlarged view of part of FIG. 2. A crank pulse rotor 50 which rotates in synchronism with a crankshaft 55 of an engine is attached to the crankshaft 55. The crank pulse rotor 50 according to the present embodiment has a configuration wherein a total of eleven reluctors (teeth) 52 are provided at intervals of 30 degrees on a rotor 51 and a toothless portion H is provided at one place. The crank pulse rotor is operable to rotate in synchronism with the crankshaft 55.

A crank pulse detection section 31 (also referred to as a crank pulse detector) in the ECU 30 is operable to detect a passing state of the reluctors 52 as a pulse signal by means of a magnetic pickup type pulse generator PC to detect a rotational position and a speed of rotation of the crankshaft 55. The crank pulse detection section 31 detects passing of the toothless portion H to detect a reference position of the crank pulse rotor 50, and divides one rotation of the crankshaft by a total eleven crank stages of #0 to #10 based on the disposition of the reluctors 52.

Thereafter, if stroke decision based on an air intake pressure variation and so forth appearing in an intake pipe is settled, then back/front decision of a stage (decision whether a crankshaft is rotating in the first rotation or in the second rotation within one cycle) is settled, and one cycle (720 degrees) of the engine is divided into totaling 22 cycle stages of #0 to #21. It may be noted that the stroke decision based on an air intake pressure variation is executed, for example, by collating a detected variation pattern of the air intake pressure and a variation pattern of the air intake pressure determined by an experiment or the like. The variation pattern determined by an experiment or the like is associated with the cycle stages.

The ECU 30 includes an NeA calculation section 38 for calculating an average engine speed NeA within a predetermined detection interval based on output signals of the crank pulse detection section 31 and a timer 37.

Further, the ECU 30 includes a fuel injection map set so that the engine is driven with a stoichiometric air fuel ratio where the engine is driven with a fuel having a predetermined alcohol concentration, and a fuel injection controlling section 36 is controlled based on a value of the fuel injection map. Besides, a signal which indicates that the engine is driven in a state in which it is based on the value of the fuel injection map set so that the engine is driven with the stoichiometric air fuel ratio where the engine is driven with a fuel having a predetermined alcohol concentration is outputted to a Δω2/Δω1 calculation section 33.

Meanwhile, a Δω1, Δω2 calculation section 32 carries out calculation of a first variation amount Δω1 and a second variation amount Δω2 of a crank angular speed based on the average engine speed NeA calculated by the NeA calculation section 38, first crank angular speed ω1 detected in a first predetermined interval overlapping with the top dead center position of the crankshaft 55 and second crank angular speed ω2 detected in a second predetermined interval overlapping with the bottom dead center position of the crankshaft 55.

In the present illustrative embodiment, the first crank angular speed ω1 is detected in a predetermined interval overlapping with the compression top dead center (TDC), and the second crank angular speed ω2 is detected in a predetermined interval overlapping with the bottom dead center (hereinafter referred to sometimes as combustion bottom dead center) which is reached first after passing of the compression top dead center.

Referring to FIGS. 2 and 3, the crank angular speed ω repeats periodical variation in accordance with one cycle of the engine, that is, with four strokes of the compression, combustion and expansion, exhaust and intake strokes in accordance with the variation of the cylinder internal pressure, even where the average engine speed NeA is fixed. In particular, within the latter half interval of the compression stroke, reduction of the crank angular speed ω arising from compression resistance by a rise of the cylinder internal pressure occurs.

Meanwhile, within the interval of the combustion and expansion stroke, energy of crank rotation is generated by a rise of the cylinder internal pressure by combustion, and increase arising from this is caused. Further, the crank angular speed ω repeats such variation that it comes to a peak at the end of the combustion and expansion stroke and continues drop thereof by pump works such as mechanical frictional resistance in the engine, exhaust resistance of combustion gas in the exhaust stroke and intake resistance in the intake stroke until the intake stroke and the compression stroke are carried out again.

According to such variation of the crank angular speed ω, the first crank angular speed ω1 detected in the proximity of the compression top dead center is lower than the average engine speed NeA, and the second crank angular speed ω2 detected in the proximity of the combustion bottom dead center is higher than the average engine speed NeA (when the average engine speed NeA is 3,000 rpm, for example, the first crank angular speed ω1 is ω1=2,900 rpm and the second crank angular speed ω2 is ω2=3,100 rpm).

It may be noted that the variation peak of the crank angular speed ω becomes higher as the generated torque of the engine becomes higher, and the dropping amount after then increases as the intake air amount increases. Accordingly, an engine which generates higher torque and takes in a greater amount of air exhibits a greater variation of the crank angular speed ω. Further, this variation is greater in a lower speed region in which the force of inertia of the crankshaft is lower and is greater with an engine which has a smaller number of cylinders and has a greater explosion interval.

In other words, an engine wherein the moment of inertia of a crankshaft is comparatively low like a single cylinder engine for a motorcycle has a tendency that the crank angular speed ω exhibits a great variation.

Referring back to the block diagram of FIG. 1, the Δω1, Δω2 calculation section 32 calculates a first variation amount Δω1 of a first crank angular speed ω1 (variation amount with respect to the average engine speed NeA) in the proximity of the compression top dead center, a second variation amount Δω2 of a second crank angular speed ω2 (variation amount with respect to the crank angular speed ω1) in the proximity of the combustion bottom dead center. The first variation amount Δω1 is calculated in accordance with an expression of Δω1=NeA−ω1, and the second crank angular speed ω2 is calculated in accordance with an expression of Δω2=ω2−ω1.

The first variation amount Δω1 indicates a degree of deceleration of the crankshaft 55 arising from the compression stroke. Meanwhile, the second variation amount Δω2 indicates a degree of acceleration of the crankshaft 55 arising from the combustion and expansion stroke. Then, the calculated Δω1 and Δω2 are transmitted to the Δω2/Δω1 calculation section 33, by which a value of Δω2÷Δω1 (ratio between Δω1 and Δω2) is calculated.

An alcohol concentration derivation section 40 includes a map collation section 41, an alcohol concentration estimated value derivation section 42, and an alcohol concentration estimation map group for engine speeds 43. In the alcohol concentration estimation map group for engine speeds 43, a plurality of alcohol concentration estimation maps 43*a* corresponding to predetermined engine speeds (for example, 10 maps from 1,000 to 10,000 rpm for each 1,000 rpm) are stored.

Each alcohol concentration estimation map 43*a* is produced based on data of an experiment carried out in advance, and is a map indicating a relationship between IMEP/$\eta$c obtained by dividing an IMEP (Indicated Mean Effective Pressure) in a stoichiometric air fuel ratio operation state by $\eta$c (Charging Efficiency) and the alcohol concentration (E) of the fuel. Although a preparation procedure of the alcohol concentration estimation maps 43*a* is hereinafter described, the values IMEP/$\eta$c and the alcohol concentrations (E) are represented by a straight line of a negative gradient along which they correspond in a one-by-one correcting relationship to each other.

The map collation section 41 selects, based on the value of the average engine speed NeA calculated by the NeA calculation section 38, that one of the alcohol concentration estimation maps 43*a* with regard to which the engine speed coincides from within the alcohol concentration estimation map group for engine speeds 43. Then, the parameter of IMEP/$\eta$c indicated by the alcohol concentration estimation map 43*a* is substituted by $\Delta\omega 2/\Delta\omega 1$ calculated by the $\Delta\omega 2/\Delta\omega 1$ calculation section 33, and the alcohol concentration estimated value derivation section 42 derives the value of the alcohol concentration corresponding to $\Delta\omega 2/\Delta\omega 1$ as an estimated value of the alcohol concentration.

Here, a preparation procedure of an alcohol concentration estimation map 43*a* is described with reference to FIGS. 4 to 10.

The IMEP (Indicated Mean Effective Pressure) of an engine is determined, where the engine is a single engine for an arbitrary use, by the intake air mass (charging efficiency: $\eta$c), air fuel ratio (A/F) and ignition timing. Accordingly, if an ignition timing (MBT) which provides maximum torque generation is given while it always is a predetermined ignition timing (for example, the throttle opening is fixed and the engine speed is fixed) in various operation conditions, then the relationship between IMEP and $\eta$c is determined only by the air fuel ratio (A/F). Therefore, by estimating IMEP and $\eta$c, estimation calculation of the air fuel ratio (A/F) can be carried out.

Figure 4:
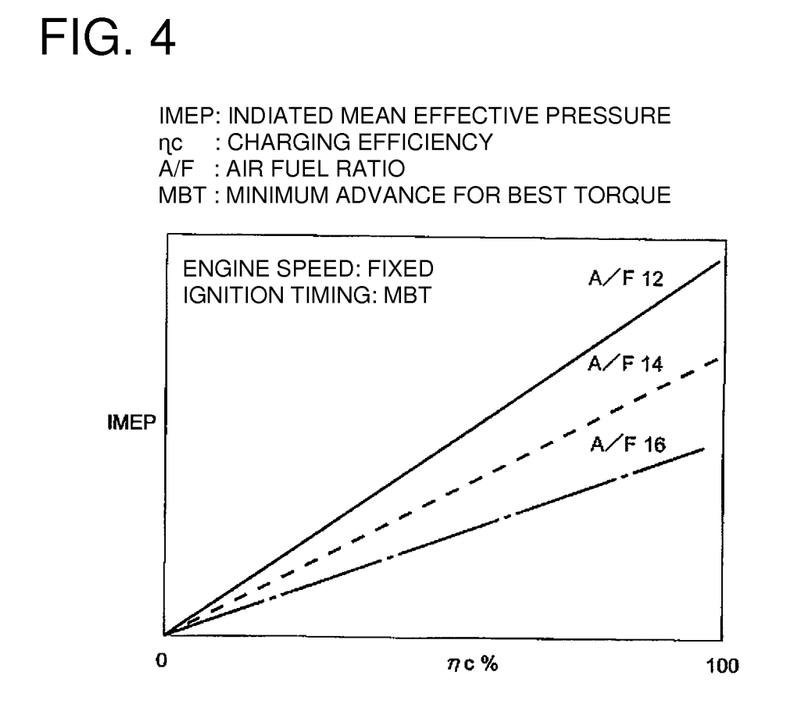
FIG. 4 is a graph illustrating a relationship between an IMEP and an $\eta c$ map at different air fuel ratios.

An IMEP-$\eta$c map indicative of IMEP (Indicated Mean Effective Pressure) and $\eta$c (filing efficiency) is configured from a plurality of straight lines having different slopes from each other which correspond to different air fuel ratios as shown in FIG. 4. This arises from the fact that, where the engine speed is fixed and the ignition timing is set to MBT (Minimum Advance for Best Torque) and besides the air fuel ratio (A/F) in the combustion gas is fixed, IMEP (Indicated Mean Effective Pressure) and $\eta$c (Charging Efficiency) satisfy a proportional relationship.

It may be noted that the ignition timing MBT is a value derived by an experiment or the like in advance (for example, at 3,000 rpm, 0 degrees). Meanwhile, the charging efficiency (Charging Efficiency) $\eta$c is an efficiency regarding the mass of intake fresh air which can be taken into a combustion chamber at the intake stroke at a predetermined air pressure and a predetermined temperature. Further, the IMEP (Indicated Mean Effective Pressure) is a value obtained by dividing the work done in a cylinder generated by combustion by the stroke volume (for example, 500 kPa) and is one of the indices for representing a performance of the engine depending upon the rate of occurrence of the work irrespective of the total stroke volume.

The alcohol concentration estimation and detection apparatus according to the present embodiment derives a value of the alcohol concentration corresponding to the value of IMEP/$\eta$c ($\Delta\omega 2/\Delta\omega 1$) of the alcohol concentration estimation map 43*a* as an estimated value.

The foundation which makes derivation of such an estimated value as just described firstly resides in that, in a condition that the engine speed is fixed, a correlation (proportional relationship) between the deceleration degree of the crank angular speed and the charging efficiency $\eta$c in the compression stroke is satisfied. This is because the deceleration degree of the crank angular speed in the compression stroke arises from the compression pressure resistance in the cylinder.

The second foundation resides in that, in the condition that the engine speed is fixed, the acceleration degree of the crank angular speed in the combustion and expansion stroke satisfies a correlation (proportional relationship) with the torque (indicated mean effective pressure) by combustion. This is because the acceleration degree of the crank angular speed during the combustion and expansion stroke arises from the combustion pressure in the cylinder.

Further, the output power of an engine is normally determined from the intake air mass, air fuel ratio (A/F) and ignition timing. Here, if the ignition timing is normally set to an appropriate value, then the relationship between IMEP (Indicated Mean Effective Pressure) and $\eta$c (Charging Efficiency) is determined only by the air fuel ratio.

Based on the forgoing, if the first variation amount $\Delta\omega 1$ is calculated, then $\eta$c can be estimated. Similarly, if the second variation amount $\Delta\omega 2$ is calculated, then IMEP can be estimated. Accordingly, if the ignition timing is set to a certain appropriate value, particularly to the MBT, then the relationship among IMEP, $\eta$c and A/F is determined for each predetermined engine speed. By converting this relationship into data through an experiment, the IMEP-$\eta$c map shown in FIG. 4 can be obtained.

In particular, when the engine speed is fixed and the ignition timing is given as the MBT, where the air fuel ratio A/F is fixed, $\eta$c and IMEP increase in proportion to each other and the constant of proportionality is determined by air fuel ratio A/F.

Figure 5:
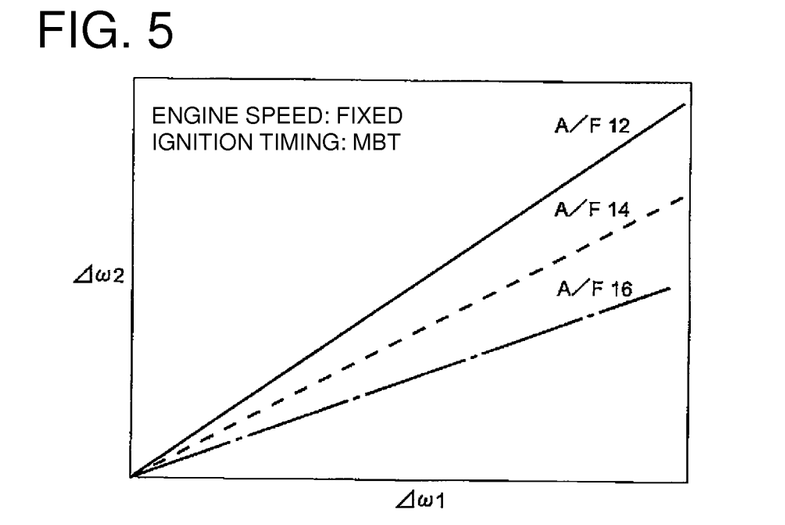
FIG. 5 is a graph illustrating a relationship between $\Delta\omega 1$ and $\Delta\omega 2$ at different air fuel ratios.

According to the fact that a proportional relationship is satisfied by the first variation amount $\Delta\omega 1$ and the charging efficiency $\eta$c, and the fact that a proportional relationship is satisfied by the second variation amount $\Delta\omega 2$ and IMEP, the relationship among $\Delta\omega 1$, $\Delta\omega 2$ and the air fuel ratio (A/F) can be indicated as a $\Delta\omega 1$-$\Delta\omega 2$ map shown in FIG. 5.

Figure 6:
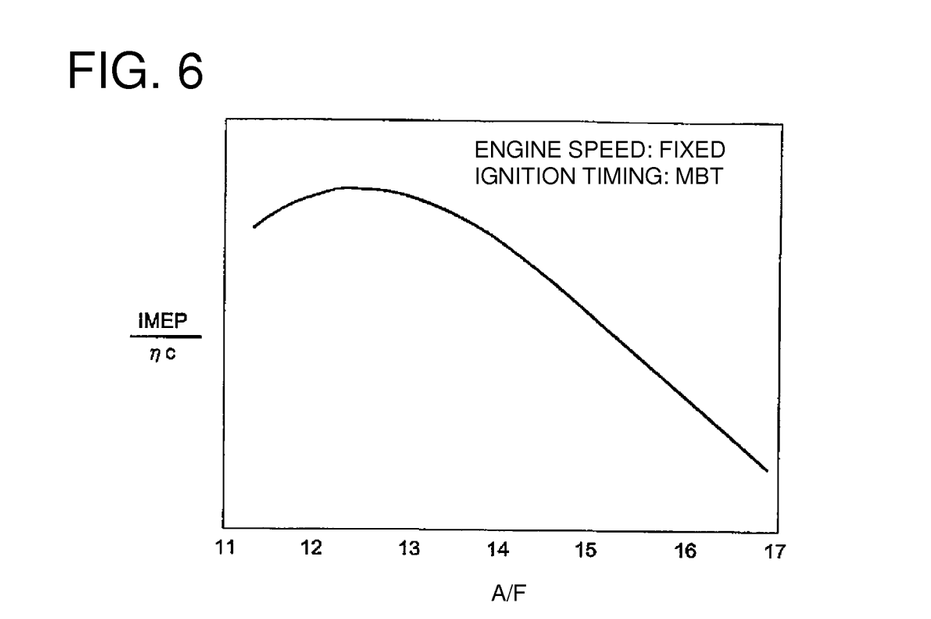
FIG. 6 is a graph illustrating a relationship between IMEP/$\eta c$ and A/F.

As a result, the relationship between IMEP/$\eta$c and A/F may be presented a graph as shown in FIG. 6. In particular, the relationship between the indicated mean effective pressure/charging efficiency and the air fuel ratio becomes such as shown in FIG. 6 when the average engine speed NeA is fixed and the ignition timing is the MBT. For example, where the fuel is a gasoline fuel having an alcohol concentration E=0%, IMEP/$\eta$c forms an upwardly convex curved line which exhibits a maximum value when the A/F is 12 to 13.

Figure 7:
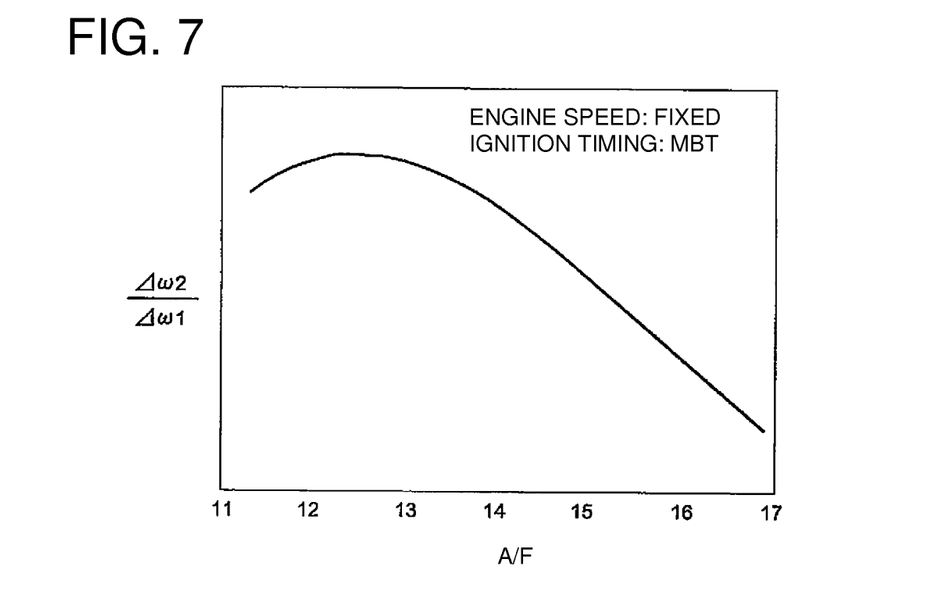
FIG. 7 is a graph illustrating a relationship between $\Delta\omega 2/\Delta\omega 1$ and A/F.

Similarly, the relationship between $\Delta\omega 2/\Delta\omega 1$ and A/F may be presented by a graph as shown in FIG. 7. When the engine speed is fixed and the ignition timing is the MBT, $\Delta\omega 2/\Delta\omega 1$ forms an upwardly convex curved line which indicates a maximum value when A/F is 12 to 13.

Figure 8:
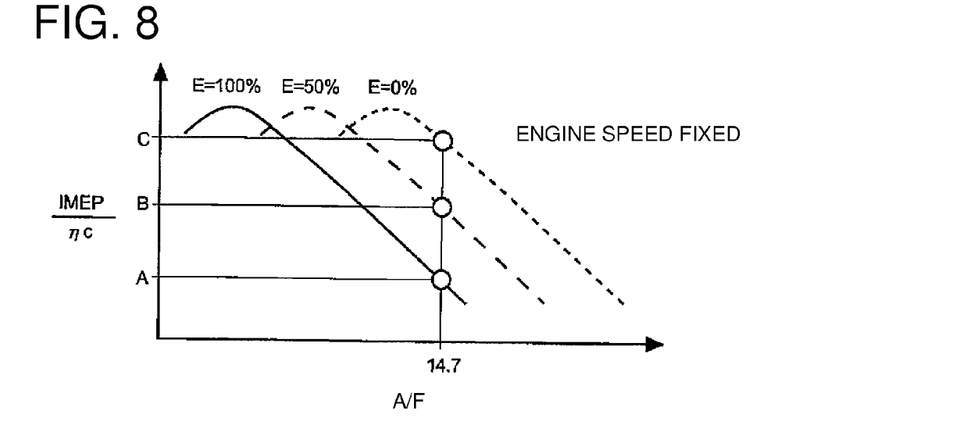
FIG. 8 is a graph illustrating a relationship between IMEP/$\eta c$ and A/F for each alcohol concentration.

For example, where the fuel is ethyl alcohol-containing gasoline, the relationship between A/F and IMEP/$\eta$c for each difference in alcohol concentration E becomes such as illustrated in FIG. 8. Since the low calorific power of the fuel is 61% where the fuel is ethyl alcohol in comparison with that where the fuel is gasoline, as the alcohol concentration increases, IMEP/$\eta$c ($\Delta\omega2/\Delta\omega1$) with respect to the same air fuel ratio (A/F) decreases as the alcohol concentration increases.

For example, where the engine is operated with a value of a fuel injection map set such that a stoichiometric air fuel ratio (14.7) is achieved when the engine is operated with a fuel whose alcohol concentration E is E=0(%) (with gasoline), if the alcohol concentration E is E=100%, then IMEP/$\eta$c=A value; if the alcohol concentration E is E=50%, then IMEP/$\eta$c=B value; and if the alcohol concentration E is E=0% (gasoline), then IMEP/$\eta$c=C value, as shown in FIG. 8.

Figure 9:
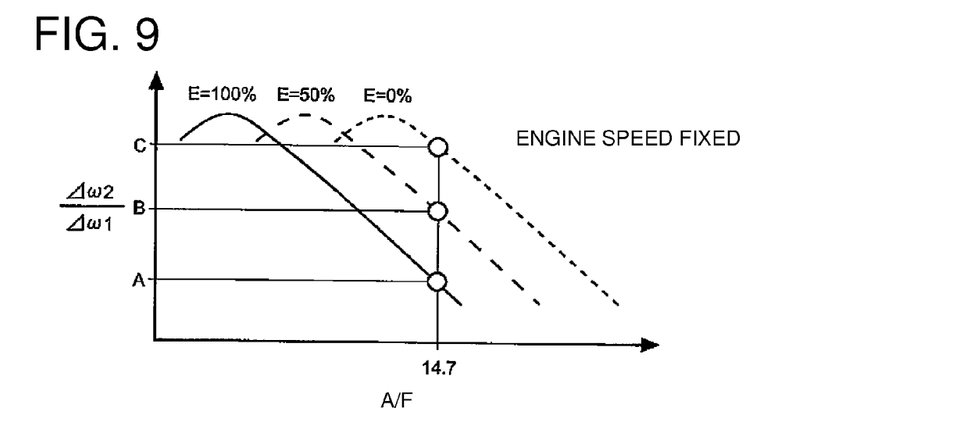
FIG. 9 is a graph illustrating a relationship between $\Delta\omega 2/\Delta\omega 1$ and A/F for each alcohol concentration.
Figure 10:
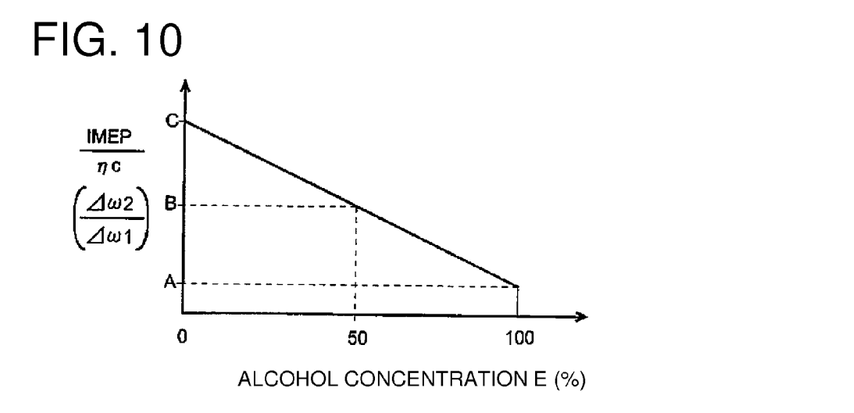
FIG. 10 is an example of a map indicative of a relationship between IMEP/$\eta c$ ($\Delta\omega 2/\Delta\omega 1$) and the alcohol concentration (E).

Meanwhile, the relationship between A/F and $\Delta\omega2/\Delta\omega1$ depending upon the difference in alcohol concentration E may be represented as illustrated in FIG. 9. Consequently, in a condition that the engine is operated in accordance with a fuel injection map set such that it is operated at a stoichiometric air fuel ratio when it is operated at a fixed engine speed with a fuel of a predetermined alcohol concentration, the relationship (alcohol concentration estimation map 43$a$) between the alcohol concentration E and IMEP/$\eta$c ($\Delta\omega2/\Delta\omega1$) may be represented as illustrated in FIG. 10.

A derivation procedure of an estimated alcohol concentration by the alcohol concentration derivation section 40 is described herein.

Figure 11:
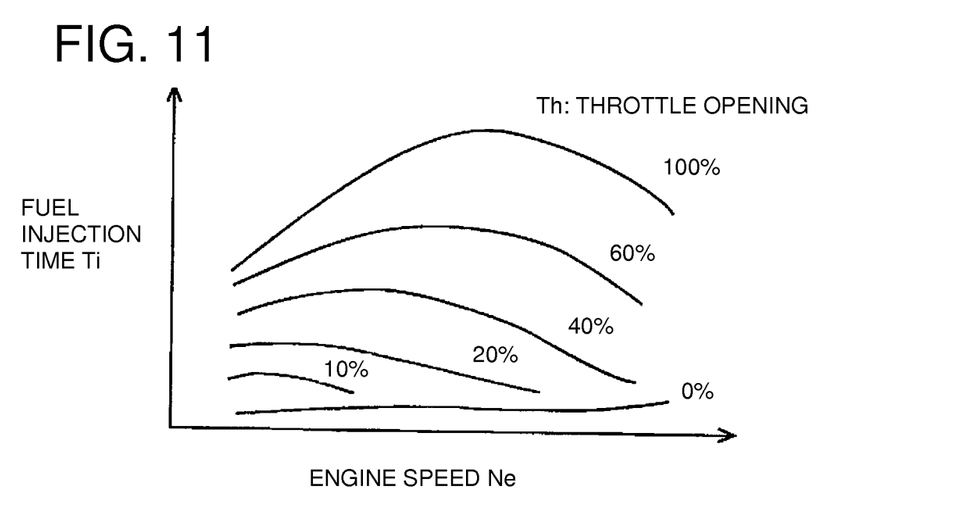
FIG. 11 is a fuel injection map set for each throttle opening Th so that an engine can be operated at a stoichiometric air fuel ratio where the engine is operated with a fuel of a predetermined alcohol concentration.

FIG. 11 illustrates a fuel injection map set such that the engine is operated at a stoichiometric air fuel ratio where it is operated with a fuel of a predetermined alcohol concentration, and fuel injection time Ti corresponding to an engine speed Ne is determined from a plurality of curved lines set for individual throttle openings Th. In the fuel injection map of FIG. 11, only curved lines when the throttle opening Th is "0%," "20%," "40%," "60%" and "100%" are shown.

In the engine, control of the fuel injection amount from a fuel injection system 66 is carried out through the fuel injection controlling section 36 in response to the throttle opening detected by the throttle opening sensor (not shown) based on the setting of the fuel injection map.

In this state, NeA is calculated by the NeA calculation section 38 and $\Delta\omega2/\Delta\omega1$ corresponding to IMEP/$\eta$c is calculated by the $\Delta\omega2/\Delta\omega1$ calculation section 33, and an alcohol concentration estimated value at $\Delta\omega2/\Delta\omega1$ calculated using the alcohol concentration estimation map for each engine speed can be derived by prediction calculation by the map collation section 41.

The predicted alcohol concentration derived by the alcohol concentration estimated value derivation section 42 is transmitted to an ignition controlling section 35, which drives and controls an ignition system 65, and to the fuel injection controlling section 36, which drives and controls the fuel injection system 66. Then, the engine is operated with the setting of the fuel injection map corresponding to the detected alcohol concentration.

Accordingly, the ECU 30 can appropriately control the ignition system 65, fuel injection system 66 and so forth using the estimated alcohol concentration without using a sensor for detecting the air fuel ratio such as an oxygen sensor or a sensor for detecting the intake air mass such as an air flow sensor or an intake negative pressure sensor.

Now, an example of ignition timing control of the ignition system 65 by the ignition controlling section 35 is described using an estimated alcohol concentration.

The ignition controlling section 35 searches and acquires an ignition timing (IG) map prepared in advance which corresponds to the estimation alcohol concentration E derived by the alcohol concentration estimated value derivation section 42. The ignition timing (IG) map is configured from a function F(NeA, $\Delta\omega2$) of NeA and $\Delta\omega2$ prepared based, for example, on a result of an actual engine test. The ignition timing given from NeA and $\Delta\omega2$ is acquired by a search of the ignition timing (IG) map. The ignition timing IG is outputted based on them.

A calculation procedure of $\Delta\omega1$ and $\Delta\omega2$ by the $\Delta\omega1$, $\Delta\omega2$ calculation section 32 is described with reference to FIGS. 2 and 3 again.

The crank angular speed $\omega$ has the minimum value when the crankshaft 55 is at the position of the compression top dead center (TDC), that is, when the crank angle is 0 degrees. Accordingly, the deceleration degree of the crankshaft 55 caused by the compression stroke is represented by the first variation amount $\Delta\omega1$ of the crank angular speed (average engine speed NeA–first crank angular speed $\omega1$).

Further, the crank angular speed $\omega$ has the maximum value when the crankshaft 55 is positioned at the combustion bottom dead center, that is, when the crank angle is 180 degrees. Accordingly, the acceleration degree of the crankshaft 55 is represented by the second variation amount $\Delta\omega2$ (second crank angular speed $\omega2$–first crank angular speed $\omega1$) of the crank angular speed from the compression top dead center to the combustion bottom dead center.

In the present embodiment, as shown in FIG. 3, the first crank angular speed $\omega1$ is represented from passing time $\tau1$ through an interval of 30 degrees (first predetermined interval) from a falling edge point C1 of a crank pulse P1 positioned immediately before the compression top dead center to a falling edge point C2 of a crank pulse P2 which is positioned immediately after the compression top dead center.

Further, the second crank angular speed $\omega2$ is calculated from passing time $\tau2$ through an interval of 30 degrees (second predetermined interval) from a falling edge point C3 of a crank pulse P3 which is positioned immediately before the combustion bottom dead center to a falling edge point C4 of a crank pulse P4 which is positioned immediately after the combustion bottom dead center.

The first variation amount $\Delta\omega1$ is calculated by subtracting the crank angular speed $\omega1$ from the average engine speed NeA, and the second variation amount $\Delta\omega2$ is calculated by subtracting the first crank angular speed $\omega1$ from the second crank angular speed $\omega2$. After the variation amounts $\Delta\omega1$ and $\Delta\omega2$ are calculated, an estimated value of the alcohol concentration E in the alcohol concentration estimation map 43$a$ can be derived from the value of $\Delta\omega2/\Delta\omega1$ equal to IMEP/$\eta$c, as described hereinabove.

As described above, with the alcohol concentration estimation and detection apparatus according to the present invention, perceiving that a proportional relationship is satisfied by the first variation amount $\Delta\omega1$ and the charging efficiency $\eta$c and that a proportional relationship is satisfied by the second variation amount $\Delta\omega2$ and the indicated mean effective pressure (IMEP) under the predetermined condition, the alcohol concentration in a fuel can be estimated and detected based on a crank angular speed detected from a crank pulser signal.

Accordingly, the ignition system, fuel injection system and so forth can be controlled appropriately taking the variation of the alcohol concentration into consideration without using a sensor for detecting the air fuel ratio such as an oxygen sensor, a sensor for detecting the intake air mass such as an air flow sensor or an intake negative pressure sensor or the like.

It may be noted that the configuration or the shape of the crank pulse rotor or the pulse generator, the form or the number of alcohol concentration estimation maps, the internal configuration of the ECU or the like are not limited to that of the embodiment described hereinabove, but allows various alterations.

For example, while, in the embodiment described above, $\Delta\omega1$ and $\Delta\omega2$ are calculated within periods across the compression top dead center and the combustion bottom dead center, respectively, the calculation positions may be displaced by a predetermined angle in the leading direction or retarding direction in accordance with the total stroke volume, the form and so forth of the engine.

Also, the length of a period within which $\omega1$ and $\omega2$ should be calculated can be altered arbitrarily in response to the shape or the like of the reluctors of the crank pulse rotor. Also it is possible to form the reluctors of the crank pulse rotor so as to stretch over the compression top dead center and the combustion bottom dead center such that $\Delta\omega1$ and $\Delta\omega2$ can be calculated based on the passing time of the reluctors.

Further, a $\Delta\omega1$, $\Delta\omega2$ calculation section may be provided which calculates the first variation amount ($\Delta\omega1$) from a difference between the angular speed at the start of a compression stroke and the angular speed in the proximity of the compression top dead center of the engine while it calculates the second crank angular speed ($\omega2$) within the second predetermined interval ($\tau2$) overlapping with the combustion bottom dead center (BDC) of the engine and subtracts the first crank angular speed ($\omega1$) from the second crank angular speed ($\omega2$) to calculate the second variation amount ($\Delta\omega2$).

By using the alcohol concentration estimation and detection apparatus, as described hereinabove, it becomes possible to predict, in FFV control corresponding to an alcohol-containing fuel, the alcohol concentration of the fuel without incorporating a sensor for detecting the air fuel ratio such as an oxygen sensor, an intake throttle opening sensor, an intake negative pressure sensor, an atmospheric pressure sensor, an intake air flow rate sensor and so forth, and it becomes possible to always provide an ignition timing suitable for the alcohol concentration.

As a result, an FFV engine controlling system of low exhaust emission which is less expensive and good in fuel cost can be constructed. It may be noted that, if the prediction of an alcohol concentration is carried out after warming-up of the engine comes to an end, then the accuracy of the prediction can be improved. In this instance, the warming-up state of the engine should be detected by a water temperature sensor or an oil sensor such that estimation of the alcohol concentration is started at a timing at which the temperature exceeds a predetermined temperature (for example, 50° C. or higher).

The alcohol concentration estimation and detection apparatus according to the present invention may be used together with a load detection apparatus which estimates and detects a load to an engine based on a variation of the crank angular speed or can be applied not only to engines for a motorcycle but also to engines of various forms.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An alcohol concentration estimation apparatus which receives a crank pulse supplied from a pickup coil which detects passing of a plurality of reluctors provided on a crank pulse rotor which rotates in synchronism with a crankshaft of an engine, said alcohol concentration estimation apparatus comprising:
an NeA calculation section adapted to calculate an average engine speed (NeA) of the engine based on crank pulse output;
a $\Delta\omega1$, $\Delta\omega2$ calculation section operable:
to calculate a first crank angular speed ($\omega1$) within a first predetermined interval ($\tau1$) overlapping with a compression top dead center (TDC) of the engine,
and to subtract the first crank angular speed ($\omega1$) from the average engine speed (NeA) to calculate a first variation amount ($\Delta\omega1$) and to calculate a second crank angular speed ($\omega2$) within a second predetermined interval ($\tau2$) overlapping with a combustion bottom dead center (BDC) of the engine and to subtract the first crank angular speed ($\omega1$) from the second crank angular speed to calculate a second variation amount ($\Delta\omega2$);
an ignition controlling section configured to drive and control an ignition system of the engine; and
a fuel injection controlling section configured to drive and control a fuel injection system of the engine,
wherein said alcohol concentration estimation apparatus is operable to estimate an alcohol concentration of a fuel based on the values of the first variation amount ($\Delta\omega1$) and the second variation amount ($\Delta\omega2$), and
wherein the ignition controlling section controls the ignition system based on the estimated alcohol concentration and the fuel injection controlling section controls the fuel injection system based on the estimated alcohol concentration.

2. The alcohol concentration estimation apparatus according to claim 1, wherein at least one of the reluctors of the crank pulse rotor is formed so as to stretch over the one of the compression top dead center (TDC) and the combustion bottom dead center (BDC).

3. The alcohol concentration estimation apparatus according to claim 1, wherein:
the first predetermined interval ($\tau1$) is an interval from a falling point (C1) of a crank pulse (P1) positioned just before the compression top dead center (TDC) to another falling point (C2) of another crank pulse (P2) positioned just after the compression top dead center (TDC); and
the second predetermined interval ($\tau2$) is an interval from a falling point (C3) of a crank pulse (P3) positioned just before the combustion bottom dead center (BDC) to another falling point (C4) of another crank pulse (P4) positioned just after the combustion bottom dead center (BDC).

4. The alcohol concentration estimation apparatus according to claim 3, wherein at least one of the reluctors of the crank pulse rotor is formed so as to stretch over the one of the compression top dead center (TDC) and the combustion bottom dead center (BDC).

5. The alcohol concentration estimation apparatus according to claim 1, further comprising:

a fuel injection map set so as to operate the engine with a stoichiometric air fuel ratio where the engine is operated with a fuel having a predetermined alcohol concentration;

a Δω2/Δω1 calculation section operable to calculate, when the engine is operated with the setting of said fuel injection map, a ratio between the first variation amount (Δω1) and the second variation amount (Δω2); and an alcohol concentration estimation map group comprising a plurality of maps, each corresponding to individual predetermined engine speeds and indicative of a plurality of relationships between a plurality of alcohol concentrations and a parameter which increases in proportion to the alcohol concentration;

wherein said alcohol concentration estimation apparatus is operable to select one of alcohol concentration estimation maps which coincides with the average engine speed (NeA), and to determine the parameter from the ratio between the first variation amount (Δω1) and the second variation amount (Δω2) to estimate the alcohol concentration.

6. The alcohol concentration estimation apparatus according to claim 5, wherein:

the first predetermined interval (τ1) is an interval from a falling point (C1) of a crank pulse (P1) positioned just before the compression top dead center (TDC) to another falling point (C2) of another crank pulse (P2) positioned just after the compression top dead center (TDC); and the second predetermined interval (τ2) is an interval from a falling point (C3) of a crank pulse (P3) positioned just before the combustion bottom dead center (BDC) to another falling point (C4) of another crank pulse (P4) positioned just after the combustion bottom dead center (BDC).

7. The alcohol concentration estimation apparatus according to claim 5, wherein at least one of the reluctors of the crank pulse rotor is formed so as to stretch over the one of the compression top dead center (TDC) and the combustion bottom dead center (BDC).

8. The alcohol concentration estimation apparatus according to claim 5, wherein:

each of said alcohol concentration estimation maps indicates a relationship between the alcohol concentration and an indicated mean effective pressure (IMEP)/charging efficiency (ηc) of the engine under a condition that the engine is operated with a fuel injection map set so that the engine is operated in a stoichiometric air fuel ratio where the engine is operated with a fuel having a predetermined alcohol concentration; and said alcohol concentration estimation apparatus is operable to associate the first variation amount (Δω1) with the charging efficiency (ηc) and also operable to associate the second variation amount (Δω2) with the indicated mean effective pressure (IMEP) to use the associated parameters as the parameters.

9. The alcohol concentration estimation apparatus according to claim 8, wherein:

the first predetermined interval (τ1) is an interval from a falling point (C1) of a crank pulse (P1) positioned just before the compression top dead center (TDC) to another falling point (C2) of another crank pulse (P2) positioned just after the compression top dead center (TDC); and the second predetermined interval (τ2) is an interval from a falling point (C3) of a crank pulse (P3) positioned just before the combustion bottom dead center (BDC) to another falling point (C4) of another crank pulse (P4) positioned just after the combustion bottom dead center (BDC).

10. The alcohol concentration estimation apparatus according to claim 8, wherein at least one of the reluctors of the crank pulse rotor is formed so as to stretch over the one of the compression top dead center (TDC) and the combustion bottom dead center (BDC).

11. An alcohol concentration estimation apparatus which receives a crank pulse supplied from a pickup coil which detects passing of a plurality of reluctors provided on a crank pulse rotor which rotates in synchronism with a crankshaft of an engine, said alcohol concentration estimation apparatus comprising:

a Δω1, Δω2 calculation section operable to calculate:

a first variation amount (Δω1) from a difference between an angular speed upon starting of a compression stroke of the engine and an angular speed in the proximity of the compression top dead center (TDC), and a second crank angular speed (ω2) within a second predetermined interval (τ2) overlapping with the combustion bottom dead center (BDC) of the engine, and to subtract a first crank angular speed (ω1) from the second crank angular speed (ω2) to calculate a second variation amount (Δω2);

an ignition controlling section configured to drive and control an ignition system of the engine; and a fuel injection controlling section configured to drive and control a fuel injection system of the engine, wherein said alcohol concentration estimation apparatus is operable to estimate an alcohol concentration of a fuel based on the values of the first variation amount (Δω1) and the second variation amount (Δω2), and wherein the ignition controlling section controls the ignition system based on the estimated alcohol concentration and the fuel injection controlling section controls the fuel injection system based on the estimated alcohol concentration.

12. The alcohol concentration estimation apparatus according to claim 11, wherein the second predetermined interval (τ2) is an interval from a falling point (C3) of a crank pulse (P3) positioned just before the combustion bottom dead center (BDC) to another falling point (C4) of another crank pulse (P4) positioned just after the combustion bottom dead center (BDC).

13. The alcohol concentration estimation apparatus according to claim 11, wherein at least one of the reluctors of the crank pulse rotor is formed so as to stretch over the one of the compression top dead center (TDC) and the combustion bottom dead center (BDC).

14. An alcohol concentration estimation apparatus, comprising:

a crank pulse detector operable to receive a crank pulse supplied from a pickup coil which detects passing of a plurality of teeth provided on a crank pulse rotor which rotates in synchronism with a crankshaft of an engine, an NeA calculation section adapted to calculate an average engine speed (NeA) of the engine based on crank pulse output received from the crank pulse detector; and a Δω1, Δω2 calculation section operable:

to calculate a first crank angular speed (ω1) within a first predetermined interval (τ1) overlapping with a compression top dead center (TDC) of the engine, and to subtract the first crank angular speed (ω1)

from the average engine speed (NeA) to calculate a first variation amount ($\Delta\omega 1$) and to calculate a second crank angular speed ($\omega 2$) within a second predetermined interval ($\tau 2$) overlapping with a combustion bottom dead center (BDC) of the engine and to subtract the first crank angular speed ($\omega 1$) from the second crank angular speed to calculate a second variation amount ($\Delta\omega 2$);

a fuel injection map set so as to operate the engine with a stoichiometric air fuel ratio where the engine is operated with a fuel having a predetermined alcohol concentration;

a $\Delta\omega 2/\Delta\omega 1$ calculation section operable to calculate, when the engine is operated with the setting of said fuel injection map, a ratio between the first variation amount ($\Delta\omega 1$) and the second variation amount ($\Delta\omega 2$); and an ignition controlling section configured to drive and control an ignition system of the engine; and a fuel injection controlling section configured to drive and control a fuel injection system of the engine, an alcohol concentration derivation section comprising:

alcohol concentration estimation maps provided for individual predetermined engine speeds and indicative of a plurality of relationships between a plurality of alcohol concentrations and a parameter which increases in proportion to the alcohol concentration;

a map collation section operable to receive input from the NeA calculation section, the $\Delta\omega 2/\Delta\omega 1$ calculation section, and the alcohol concentration estimation map group; and an alcohol concentration estimated value derivation section operable to select one of alcohol concentration estimation maps which coincides with the average engine speed (NeA), and to determine the parameter from the ratio between the first variation amount ($\Delta\omega 1$) and the second variation amount ($\Delta\omega 2$) to estimate the alcohol concentration, wherein the ignition controlling section controls the ignition system based on the estimated alcohol concentration and the fuel injection controlling section controls the fuel injection system based on the estimated alcohol concentration.

15. The alcohol concentration estimation apparatus according to claim 14, wherein at least one of the teeth of the crank pulse rotor is formed so as to stretch over the one of the compression top dead center (TDC) and the combustion bottom dead center (BDC).

16. The alcohol concentration estimation apparatus according to claim 14, wherein the first predetermined interval ($\tau 1$) is an interval from a falling point (C1) of a crank pulse (P1) positioned just before the compression top dead center (TDC) to another falling point (C2) of another crank pulse (P2) positioned just after the compression top dead center (TDC); and wherein the second predetermined interval ($\tau 2$) is an interval from a falling point (C3) of a crank pulse (P3) positioned just before the combustion bottom dead center (BDC) to another falling point (C4) of another crank pulse (P4) positioned just after the combustion bottom dead center (BDC).

17. The alcohol concentration estimation apparatus according to claim 16, wherein at least one of the reluctors of the crank pulse rotor is formed so as to stretch over the one of the compression top dead center (TDC) and the combustion bottom dead center (BDC).

18. The alcohol concentration estimation apparatus according to claim 14, wherein each of the alcohol concentration estimation maps indicates a relationship between the alcohol concentration and an indicated mean effective pressure (IMEP)/charging efficiency ($\eta c$) of the engine under a condition that the engine is operated with a fuel injection map set so that the engine is operated in a stoichiometric air fuel ratio where the engine is operated with a fuel having a predetermined alcohol concentration; and wherein said alcohol concentration estimated value derivation section is operable to associate the first variation amount ($\Delta\omega 1$) with the charging efficiency ($\eta c$) and also operable to associate the second variation amount ($\Delta\omega 2$) with the indicated mean effective pressure (IMEP) to use the associated parameters as the parameters.

19. The alcohol concentration estimation apparatus according to claim 18, wherein the first predetermined interval ($\tau 1$) is an interval from a falling point (C1) of a crank pulse (P1) positioned just before the compression top dead center (TDC) to another falling point (C2) of another crank pulse (P2) positioned just after the compression top dead center (TDC);

and wherein the second predetermined interval ($\tau 2$) is an interval from a falling point (C3) of a crank pulse (P3) positioned just before the combustion bottom dead center (BDC) to another falling point (C4) of another crank pulse (P4) positioned just after the combustion bottom dead center (BDC).

20. The alcohol concentration estimation apparatus according to claim 18, wherein at least one of the reluctors of the crank pulse rotor is formed so as to stretch over the one of the compression top dead center (TDC) and the combustion bottom dead center (BDC).

* * * * *